US005950113A

United States Patent [19]
Meihofer

[11] Patent Number: 5,950,113
[45] Date of Patent: Sep. 7, 1999

[54] METHOD AND APPARATUS FOR INBOUND TRANSMISSION IN A TWO-WAY RADIO MESSAGING SYSTEM

[75] Inventor: Eric Frederick Meihofer, Euless, Tex.

[73] Assignee: Motorola, Inc., Schaumburg, Ill.

[21] Appl. No.: 08/909,706

[22] Filed: Aug. 11, 1997

[51] Int. Cl.⁶ .................................................. H04Q 7/12
[52] U.S. Cl. ........................ 455/10; 455/11.1; 455/18; 455/517; 455/31.3
[58] Field of Search ............................... 455/11.1, 15, 18, 455/517, 524, 575, 7, 9, 10, 31.3, 500

[56] References Cited

U.S. PATENT DOCUMENTS

| | | | |
|---|---|---|---|
| 4,875,038 | 10/1989 | Siwiak et al. | 455/31.3 |
| 5,432,839 | 7/1995 | DeLuca | 455/11.1 X |
| 5,479,400 | 12/1995 | Dilworth et al. | 455/403 |
| 5,530,437 | 6/1996 | Goldberg | 340/825.08 |
| 5,689,802 | 11/1997 | Luzzatto | 455/11.1 |
| 5,850,593 | 12/1998 | Uratani | 455/11.1 |

*Primary Examiner*—Wellington Chin
*Assistant Examiner*—Yemane Woldetatios
*Attorney, Agent, or Firm*—R. Louis Breeden

[57] ABSTRACT

A first portable subscriber unit (122, 602) of a plurality of portable subscriber units transmits (504) an inbound message (400) on an inbound channel. The inbound message is intended for a base receiver (616). The inbound message is received (506) by a second portable subscriber unit (606, 608) of the plurality of portable subscriber units. The second portable subscriber unit retransmits (520) the inbound message on the inbound channel only when a predetermined attribute of the inbound message satisfies (508, 510, 512, 514, 518) a predetermined condition.

12 Claims, 4 Drawing Sheets

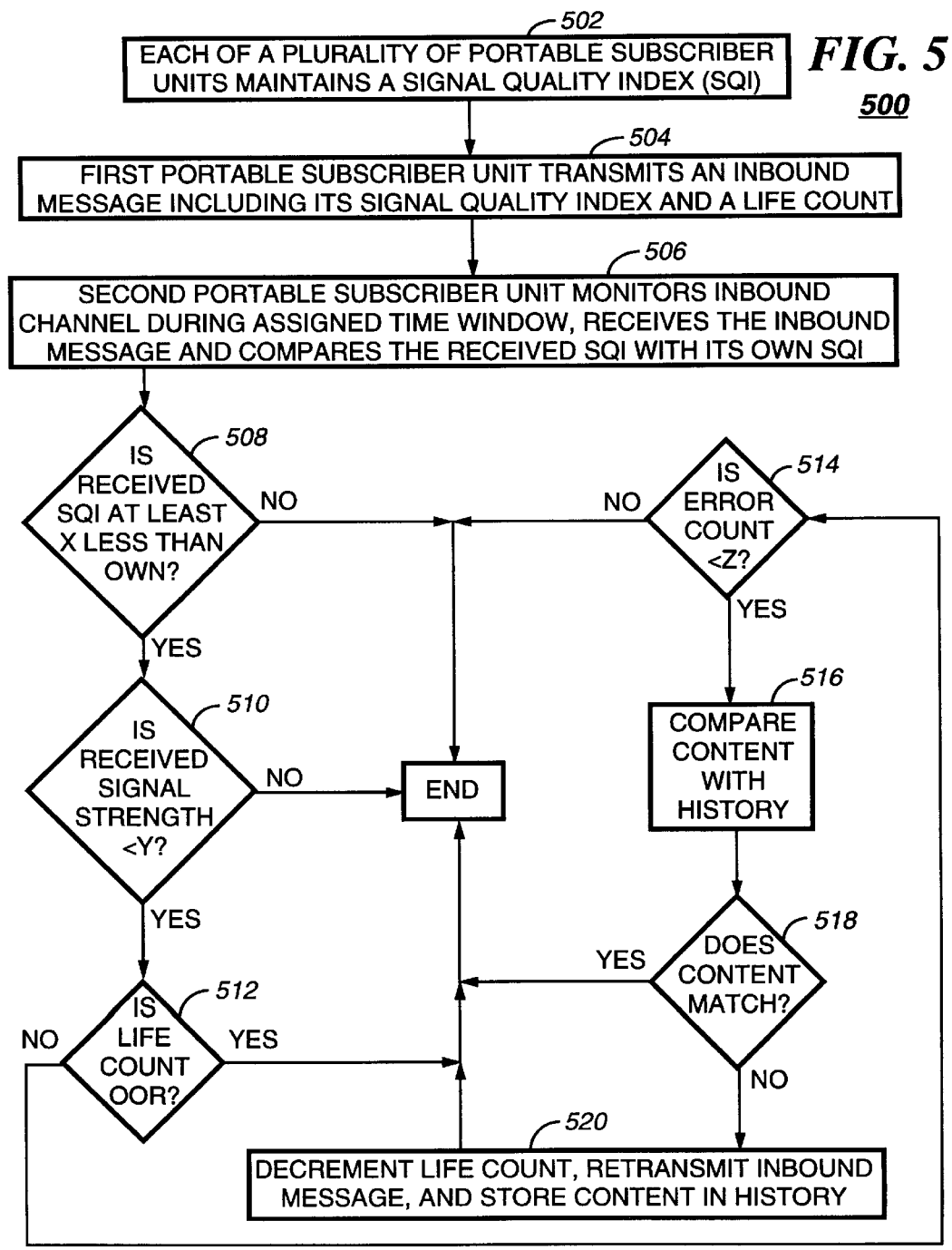

5,950,113

METHOD AND APPARATUS FOR INBOUND TRANSMISSION IN A TWO-WAY RADIO MESSAGING SYSTEM

FIELD OF THE INVENTION

This invention relates in general to radio communication systems, and more specifically to a method and apparatus for inbound transmission in a two-way radio messaging system.

BACKGROUND OF THE INVENTION

Modern selective call systems are rapidly evolving into two-way radio messaging systems. Two-way systems advantageously provide confirmation of message delivery, as well as automatic retry upon a failure of a message delivery attempt. In addition, two-way systems allow users of portable subscriber units to originate as well as receive messages.

A problem with a two-way radio messaging system is that the transmitter power of the portable subscriber unit, and thus the transmission range, is limited by battery life considerations. As a result, multiple, high sensitivity base receivers usually are distributed about the system to achieve good reliability of inbound (i.e., portable subscriber unit to base receiver) transmissions. Such base receivers undesirably add cost to the infrastructure of the system, and service providers understandably want to minimize the number required. Sometimes, especially in new systems, economic constraints result in an insufficient number of base receivers for adequate inbound coverage throughout the outbound coverage area.

Thus, what is needed is a reliable method and apparatus for inbound transmission in a two-way radio messaging system. Preferably, the method and apparatus will provide reliable inbound transmissions using fewer base receivers in the system, compared to prior art techniques.

SUMMARY OF THE INVENTION

An aspect of the present invention is a method for inbound transmission in a two-way radio messaging system including a base transmitter and a base receiver, the system also including a plurality of portable subscriber units. The method comprises the steps of transmitting, by a first portable subscriber unit of the plurality of portable subscriber units, an inbound message on an inbound channel, the inbound message intended for the base receiver; and receiving the inbound message, by a second portable subscriber unit of the plurality of portable subscriber units. The method further comprises the step of retransmitting the inbound message on the inbound channel, by the second portable subscriber unit only when a predetermined attribute of the inbound message satisfies a predetermined condition.

Another aspect of the present invention is a portable subscriber unit for inbound transmission in a two-way radio messaging system including a base transmitter and a base receiver. The portable subscriber unit comprises an antenna for transmitting and receiving messages, and a receiver coupled to the antenna for receiving an inbound message intended for the base receiver and originally transmitted on an inbound channel by a second portable subscriber unit. The portable subscriber unit further comprises a transmitter coupled to the antenna for retransmitting the inbound message on the inbound channel, and a processing system coupled to the transmitter and coupled to the receiver for processing transmitted and received messages, the processing system including a memory. The processing system is programmed to control the transmitter to retransmit the inbound message on the inbound channel only when a predetermined attribute of the inbound message satisfies a predetermined condition.

BRIEF DESCRIPTION OF THE DRAWINGS

FIG. 4 is a protocol timing diagram detailing an inbound message in accordance with the present invention.

FIG. 5 is an exemplary flow chart depicting operation of the two-way radio messaging system in accordance with the present invention.

DETAILED DESCRIPTION OF THE DRAWINGS

Figure 1:
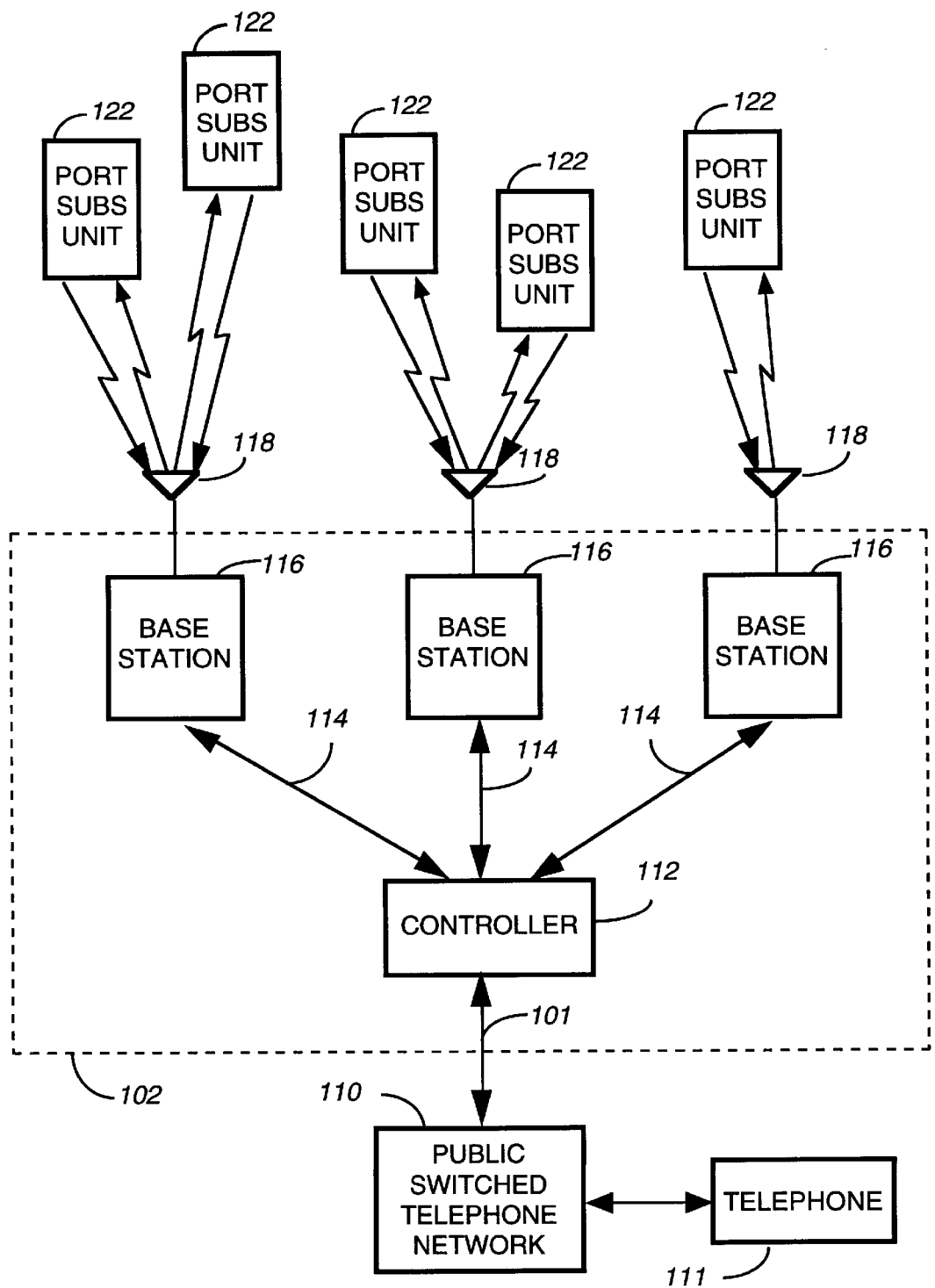
FIG. 1 is an electrical block diagram of a two-way radio messaging system in accordance with the present invention.

Referring to FIG. 1, an electrical block diagram of a two-way radio messaging system in accordance with the present invention comprises a fixed portion 102 including a controller 112 and a plurality of base stations 116, and a portable portion including a plurality of portable subscriber units 122, preferably having acknowledge-back capability. The base stations 116 communicate with the portable subscriber units 122 by radio frequency (RF) signals, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receiver manufactured by Motorola, Inc. The hardware of the portable subscriber units 122 is similar to that of Tenor™ voice messaging units and Pagefinder™ data messaging units, also manufactured by Motorola, Inc. The hardware and software of the portable subscriber units 122 are modified in accordance with the present invention, as will be described herein further below. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice and data messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests. An embodiment of an acknowledge-back messaging system is described in U.S.

Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks, local area networks, and the Internet, can be utilized as well for transporting originated messages to the controller 112.

The protocol utilized for outbound and inbound messages is preferably selected from Motorola's well-known FLEX™ family of synchronous digital selective call signaling protocols. These protocols utilize well-known error detection and error correction techniques and are therefore tolerant to bit errors occurring during transmission, provided that the bit errors are not too numerous in any one code word to be corrected. It will be appreciated that other suitable protocols can be used as well.

Figure 2:
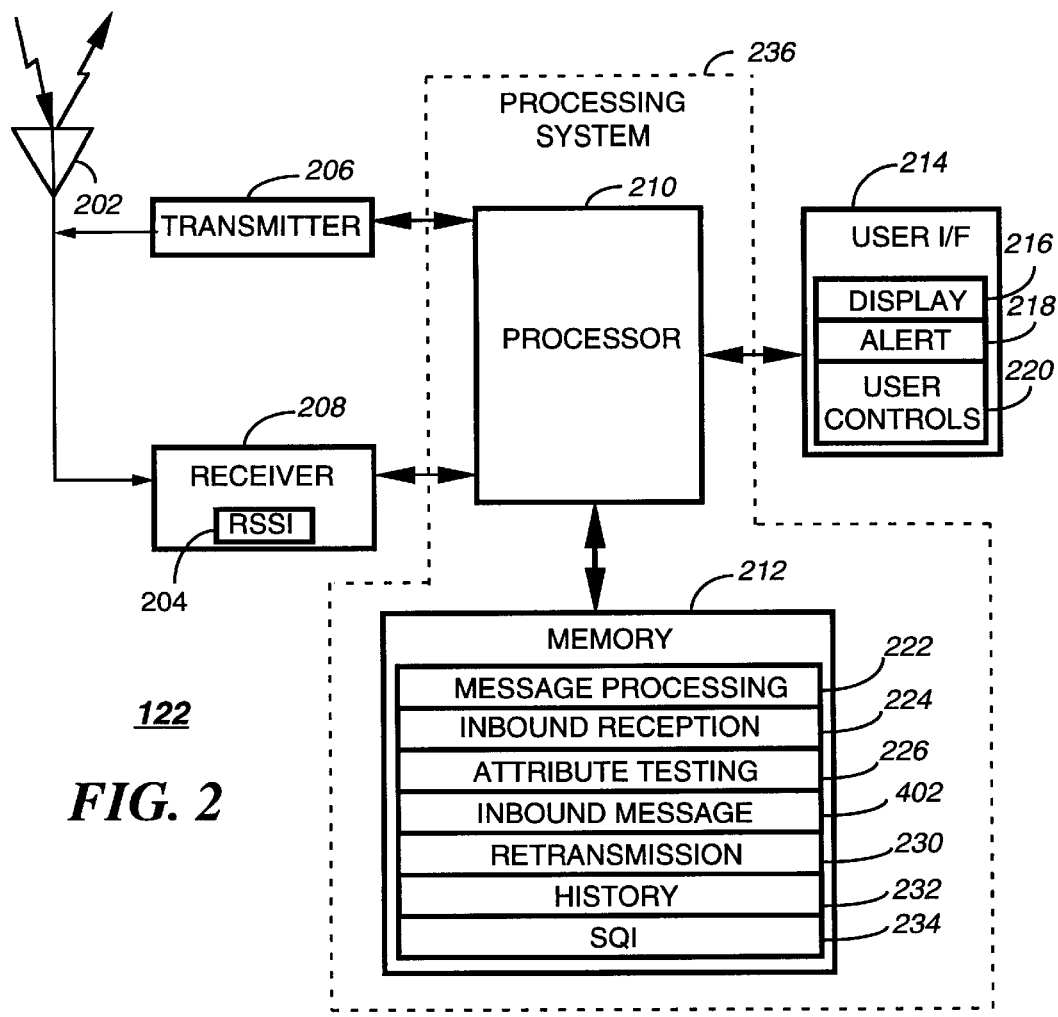
FIG. 2 is an electrical block diagram of a portable subscriber unit in accordance with the present invention.

Referring to FIG. 2, an electrical block diagram depicts the portable subscriber unit 122 in accordance with the present invention, comprising an antenna 202 for intercepting outbound transmissions from the base stations 116. The antenna 202 is coupled to a conventional receiver 208 for receiving the transmissions to derive information therefrom. The receiver 208 preferably includes a conventional received signal strength indicator (RSSI) 204 for measuring and indicating the signal strength received by the receiver 208. The receiver 208 is coupled to processing system 236, comprising a processor 210 for processing the received information, including static and dynamic programming information, as is discussed further herein below. The processing system 236 preferably controls the frequency of reception of the receiver 208, such that the receiver 208 can selectively monitor both the outbound channel for receiving an outbound message, and the inbound channel for receiving an inbound message from another portable subscriber unit 122, in accordance with the present invention.

The processing system 236 is also coupled to a user interface 214 for conveying portions of the received information to a user, via, for example, a conventional display 216. The user interface 214 also includes a conventional alert 218 for alerting the user that new information has arrived. In addition, the user interface includes conventional user controls 220 for controlling the portable subscriber unit 122. The processing system 236 is further coupled to a transmitter 206 for communicating a transmission data stream to a receiver of the base station 116. The transmitter 206 is coupled to the antenna 202 for emitting a radio signal comprising the transmission data stream. It will be appreciated that, alternatively, the antenna 202 can be replaced with two separate antennas, one for reception and the other for transmission.

The processing system 236 further comprises a conventional memory 212 for storing software and variables for programming the processor 210 in accordance with the present invention. The memory 212 comprises a message processing element 222 for programming the processor 210 to process outbound messages and to maintain synchronization with the synchronous communication protocol through well-known techniques. The memory 212 further comprises an inbound reception element 224 for programming the processor 210 to control the receiver 208 to monitor the inbound channel during a predetermined time window assigned to the portable subscriber unit 122 and synchronized with the protocol. The memory 212 also includes an attribute testing element 226 for programming the processor 210 to test selected attributes of a received inbound message 228 to determine whether to retransmit, i.e., repeat, the received inbound message 228, as will be described further below. In addition, the memory 212 includes a location for storing the received inbound message 228. The memory 212 also includes a retransmission element 230 for programming the processor 210 to control the retransmission of the inbound message. The memory 212 further comprises a history element 232 for storing a history of message contents that have been retransmitted. To conserve memory space the history element 232 preferably stores a number, such as a conventional check sum, derived from the content of each message retransmitted. It will be appreciated that, alternatively, other indicators of message content can be stored in the history element 232, including the actual characters of the message. The memory 212 also includes a signal quality index (SQI) element 234 for programming the processor 210 to maintain a current SQI indicative of a received signal quality of an outbound transmission received from a transmitter of the base station 116. The SQI preferably is maintained by the portable subscriber unit 122 using well-known techniques described further below.

Figure 3:
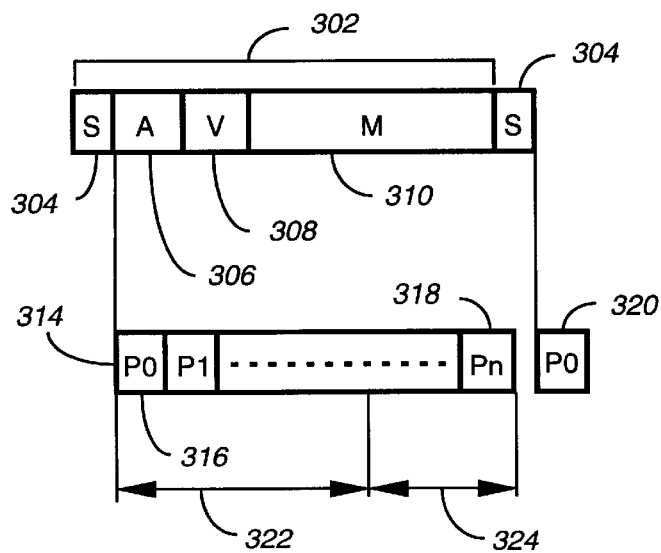
FIG. 3 is a protocol timing diagram in accordance with the present invention.

FIG. 3 is a protocol timing diagram 300 in accordance with the present invention. Preferably, the protocol comprises a plurality of contiguous frames of outbound data transmitted on an outbound channel. The frames preferably are synchronized to a time reference, such as a Global Positioning Satellite (GPS) time reference. A frame 302 is depicted in the diagram 300. The frame 302 begins with an outbound synchronization signal 304, which the portable subscriber units 122 monitor periodically to acquire synchronization with the protocol. The frame 302 further comprises an address field 306 for identifying portable subscriber units 122 for which messages about to be sent are intended. The frame 302 also includes a vector field 308 for identifying where in a subsequent message field each message corresponding to an address is to be transmitted. The frame 302 further comprises a message field 310, which contains the messages. The frame 302 is followed by the outbound synchronization signal 304 of a next frame 302. Preferably an integer number of the frames 302, e.g., 128 frames, form one cycle of the protocol. For the preferred FLEX™ protocol, one cycle has a duration of 4.0 minutes.

The diagram 300 also depicts an inbound frame 314, comprising a plurality of synchronous inbound message packets PO–Pn. Note that the first inbound message packet 316 of the inbound frame 314 is transmitted immediately after the end of the outbound synchronization signal 304, so that the inbound message packets also are synchronized to the protocol. The last inbound message packet 318 of the inbound frame 314 ends before, but not necessarily exactly at, the end of the outbound synchronization signal 304 of the next subsequent frame 302. At the end of the outbound synchronization signal 304 of the next subsequent frame 302, the first inbound message packet 320 of a next subsequent inbound frame 314 begins. Preferably, a first portion 322 of the inbound message packets is assigned exclusively to scheduled messages, while a second portion 324 is assigned to both unscheduled (ALOHA) messages and retransmitted inbound messages, in accordance with the present invention. It will be appreciated that, alternatively, the inbound message packets PO–Pn can be divided into three portions, the first portion assigned exclusively to scheduled messages, the second portion assigned exclusively to unscheduled messages, and the third portion assigned to retransmitted inbound messages. Preferably, the inbound frames 314 are transmitted on an inbound channel that operates on an RF frequency different from that utilized by the outbound channel. It will be appreciated that, alternatively, the outbound channel and the inbound channel can also operate on a single RF frequency by employing a time division technique.

FIG. 4 is a protocol timing diagram detailing the inbound message 400 in accordance with the present invention. The inbound message 400 comprises a ramp up and synchronization portion 408 for allowing the transmitter 206 to stabilize and for synchronizing the receiver 208 and the base receiver 616 (FIG. 6) with the inbound message 400 from another portable subscriber unit 122. The diagram 400 further comprises a message data portion 402. In accordance with the present invention, the inbound message 400 includes a signal quality index 404. The SQI 404 preferably is a number incode was many times a transmitter color code was received during the last N, e.g., 8, transmissions of the outbound synchronization signal 304. Alternatively, the signal quality index can be a number representing an average signal strength indicated by the RSSI 204 during the last N outbound transmissions.

The inbound message 400 also includes a life count 406, which has a predetermined value, e.g., 2, when transmitted by a portable subscriber unit 122 which is originating an inbound message. Before a portable subscriber unit 122 retransmits a received inbound message originated by another portable subscriber unit, the retransmitting portable subscriber unit 122 changes the life count 406 by a predetermined amount, e.g., decrements the life count by unity. Each time a portable subscriber unit 122 receives an inbound message, it checks the value of the life count 406. If the value of the life count 406 is outside of a predetermined range, e.g., less than 1, then the portable subscriber unit 122 does not retransmit the inbound message. This feature prevents an inbound message from being retransmitted more times than are considered useful for improving the reliability of an inbound transmission.

FIG. 5 is an exemplary flow chart 500 depicting operation of the two-way radio messaging system in accordance with the present invention. The flow chart 500 begins with each of the plurality of portable subscriber units 122 maintaining 502 a signal quality index (SQI). Next, a first portable subscriber unit 122 transmits 504, i.e., originates, an inbound message 400 including the SQI 404 maintained by the portable subscriber unit 122, along with the life count 406. A second portable subscriber unit 122, which has been assigned a predetermined time window that covers the reception time of the inbound message 400, monitors 506 the inbound channel during the predetermined time window. Preferably, the predetermined time window for monitoring the inbound channel is assigned to the portable subscriber unit 122 by the controller 112 through the base station 116. Preferably the assignment of the predetermined time window is made via a new command added to the FLEX™ two-way protocol, utilizing well-known techniques for adding a command. Alternatively, the predetermined time window can be pre-programmed into the portable subscriber unit 122. In addition, a new block information word (BIW) preferably is added to the protocol to allow the controller 112 to dynamically adjust the size of the predetermined time window according to how many portable subscriber units 122 are present in the two-way radio messaging system. This adjustment is preferably based upon the number of portable subscriber units 122 registered in the system. Alternatively, the adjustment can be based on other factors, such as time of day, day of week, or measured traffic in the system.

Because the inbound time slot (a timing attribute of the inbound message) used by the first portable subscriber unit 122 falls within the predetermined time window of the second portable subscriber unit 122, the second portable subscriber unit 122 receives the inbound message 400. The second portable subscriber unit 122 then compares the received SQI 404 with its own SQI, which is maintained by the processor 210 in cooperation with the SQI element 234. The processing system 236 of the second portable subscriber unit 122 next checks 508 whether the received SQI 404 is at least X, e.g., 2, less than its own SQI. If not, the second portable subscriber unit 122 concludes that it is probably not much closer to the base station 116 than the first portable subscriber unit 122, and thus it should not retransmit the inbound message, and the process ends.

If, on the other hand, the received SQI 404 is at least X less than the SQI maintained by the second portable subscriber unit 122, then the processing system 236 of the second portable subscriber unit 122 cooperates with the RSSI 204 to check 510 whether the inbound message was received by the second portable subscriber unit 122 with a signal strength less than Y, e.g., a signal strength corresponding to 60–70 dB of propagation loss. If the inbound message was not received with a signal strength less than Y, the processing system 236 concludes that the first and second portable subscriber units 122 are too close to one another for a retransmission to be of much help, and the process ends. (The value of Y preferably can be adjusted by the controller 112 using a new block information word, added through well-known techniques, to achieve a desired level of retransmission probability for a given radio messaging system population.) If, on the other hand, the inbound message was received by the second portable subscriber unit 122 with a signal strength less than Y, then the processing system 236 of the second portable subscriber unit 122 checks 512 whether the life count 406 of the received message is out of range, e.g., less than 1. If so, the inbound message has been retransmitted the maximum number of times allowed, and the process ends.

If, on the other hand, the processing system 236 determines that the life count 406 is not out of range, then the processing system 236 of the second portable subscriber unit 122 checks 514 whether an error count maintained by the processing system 236 using well-known error detection and correction techniques is less than Z, e.g., less than 1 (indicating no errors after error correction in accordance with the error correcting protocol). If not, the inbound message 400 was received with too many errors, and the process ends. If, on the other hand, the processing system 236 determines that the error count is less than Z, then the processing system 236 compares 516 the message content with any message contents in the history element 232. The processing system 236 of the second portable subscriber unit 122 then checks 518 whether the inbound message 400 matches a message content (or indication thereof) in the history element 232. If so, the processing system 236 concludes that the second portable subscriber unit 122 has already retransmitted the inbound message once, and the process ends. If, however, the inbound message 400 does not match, then the processing system 236 decrements 520 the life count, retransmits the received inbound message 400 (after error correction), and stores the content (or indication thereof) of the inbound message in the history element 232.

While the exemplary flow chart 500 tests many attributes of the inbound message before retransmitting the inbound message, it will be appreciated that, alternatively, some of the tests can be changed or omitted altogether. For example, one can decide to eliminate the history element 232 and the history match check step 518 to reduce processing and storage requirements in the portable subscriber unit 122. These elements are of no use when the initial value of the life count 406 is chosen, for example, such that a maximum of two retransmissions can be performed on each inbound message 400.

Figure 6:
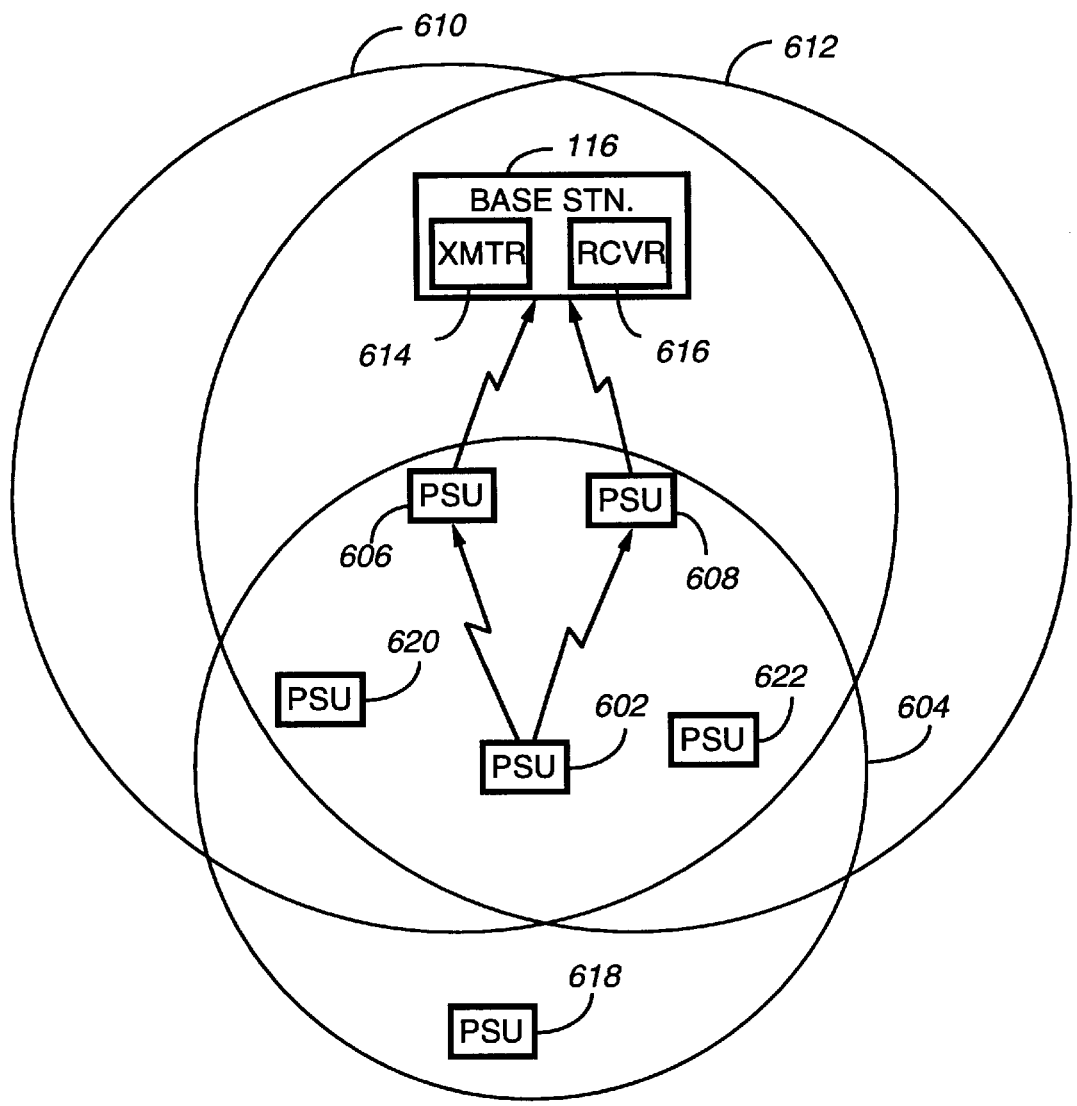
FIG. 6 is an exemplary propagation diagram depicting inbound message retransmission in accordance with the present invention.

It should be reemphasized at this point that, because the second portable subscriber unit 122 is synchronized with the synchronous protocol, as depicted in the diagram 300, the steps of receiving the inbound message and retransmitting the inbound message occur at predetermined times in a cycle of the protocol. FIG. 6 is an exemplary propagation diagram 600 depicting inbound message retransmission in accordance with the present invention. The diagram 600 depicts a first portable subscriber unit 602 having a first transmission range 604 for an inbound message. Due to the transmission environment of the first portable subscriber unit 602, e.g. signal attenuated by building walls, the first transmission range 604 is not sufficient to reach a base receiver 616 of the nearest base station 116. Second and third portable subscriber units 606, 608 are within the first transmission range 604 of the first portable subscriber unit 602. The second and third portable subscriber units 606, 608 have second and third transmission ranges 610, 612, respectively, each sufficient to reach the base receiver 616.

In accordance with the present invention, the second and third portable subscriber units 606, 608 have been assigned, for example, the same predetermined time window for monitoring the inbound channel. The time window assignment preferably is accomplished by a new outbound protocol command (similar to an existing FLEX™ family command for establishing ALOHA boundaries) sent from the controller 112. The new command can, for example, assign at least one inbound frame 314 of the cycle and at least one of the inbound packets PO–Pn of the inbound frame 314 to be monitored by a portable subscriber unit 122. Preferably, a predetermined mapping exists between a monitored inbound packet and the packet slot to be utilized for retransmitting the packet. For example, a portable subscriber unit assigned to monitor frame 1, inbound packets PO–P4, would always retransmit a P0 message in ALOHA slot 1, a P1 message in ALOHA slot 2, et cetera.

The first portable subscriber unit 602 now transmits an inbound message 400 intended for the base receiver 616. The inbound message 400 does not reach the base receiver 616. The inbound message 400 does, however, reach the second and third portable subscriber units 606, 608 during the predetermined time window assigned to the second and third portable subscriber units 606, 608 for monitoring the inbound channel. Thus, the second and third portable subscriber units 606, 608 both receive the inbound message. When the second and third portable subscriber units 606, 608 have determined that the attributes of the inbound message (as discussed herein above) meet all requirements for retransmission, the second and third portable subscriber units 606, 608 will retransmit the inbound message in the ALOHA slot to which the message is mapped by the rules of the system.

Because the same retransmission time slot is used by all retransmitters of a given inbound message 400, and because the radio messaging system uses a synchronous protocol to which all the portable subscriber units 122 are synchronized, the second and third portable subscriber units 606, 608 will retransmit the inbound message 400 simultaneously, as a simulcast transmission. As is well known in the art, a simulcast transmission, properly performed, can create additional reinforcement of the signal strength, thereby further improving reception reliability. In the preceding example, either of the portable subscriber units 606, 608 alone possesses a transmission range 610, 612 capable of reaching the base receiver 616. Thus, even if only one of the second and third portable subscriber units 606, 608 had retransmitted the inbound message 400, it likely would have been received by the base receiver 616.

Additional portable subscriber units 618, 620, 622 are within range of the first portable subscriber unit 602. The additional portable subscriber units 618, 620, 622 do not retransmit the inbound message 400, however, because one or more of the attributes of the inbound message 400 do not satisfy a predetermined condition of the additional portable subscriber units 618, 620, 622. For example, the inbound message 400 might be transmitted outside the predetermined time windows assigned to the additional portable subscriber units 618, 620, 622, or the received signal strength of the inbound message could be too high, or the reported SQI 404 could be too large compared to the SQIs currently maintained by the additional portable subscriber units 618, 620, 622.

While the foregoing example depicts the base receiver 616 to be collocated with a base transmitter 614, it will be appreciated that there can be additional base receivers 616 remote from the base transmitter 614 for obtaining a wider coverage area for receiving inbound messages. The present invention, however, advantageously minimizes the number of such additional base receivers required.

Thus, it should be clear from the preceding disclosure that the present invention provides a method and apparatus for performing reliable inbound transmissions in a two-way radio messaging system. Advantageously, the method and apparatus can perform reliable inbound transmissions using fewer base receivers in the system, compared to prior art techniques.

Many modifications and variations of the present invention are possible in light of the above teachings. Thus, it is to be understood that, within the scope of the appended claims, the invention can be practiced other than as described herein above.

What is claimed is:

1. A method for inbound transmission in a two-way radio messaging system including a base transmitter and a base receiver, the system also including a plurality of portable subscriber units, the method comprising the steps of:

transmitting, by a first portable subscriber unit of the plurality of portable subscriber units, an inbound message on an inbound channel, the inbound message intended for the base receiver;

receiving the inbound message, by a second portable subscriber unit of the plurality of portable subscriber units; and determining whether to retransmit the inbound message by performing at least one of:

a content history method;

a life count method; and a signal quality method, wherein the content history method comprises the steps of:

comparing, by the second portable subscriber unit, a content of the inbound message with contents of most recently retransmitted inbound messages in a history stored in a memory;

retransmitting the inbound message on the inbound channel, by the second portable subscriber unit, only when the content of the inbound message does not match the content of any message in the history; and storing the content of the inbound message in the history after retransmitting the inbound message, and wherein the life count method comprises the steps of:

sending, in the transmitting step, a life count having a predetermined value with the inbound message, and changing the life count by a predetermined amount in the second portable subscriber unit and retransmitting the inbound message and the life count, only when the life count remains within a predetermined range, and wherein the signal quality method comprises the steps of:

maintaining in the plurality of portable subscriber units a plurality of signal quality indexes indicative of a received signal quality of an outbound transmission received from the base transmitter:

including with the inbound message a first signal quality index maintained by the first portable subscriber unit; and retransmitting the inbound message only when the first signal quality index is at least a predetermined amount less than a second signal quality index maintained by the second portable subscriber unit.

2. The method of claim 1, further comprising the step of measuring a signal strength at which the inbound message is received by the second portable subscriber unit, and wherein the retransmitting step comprises the step of retransmitting the inbound message only when the signal strength is below a predetermined value.

3. The method of claim 1, further comprising the step of measuring an error count of uncorrectable errors existing in the inbound message as received by the second portable subscriber unit, and wherein the retransmitting step comprises the step of retransmitting the inbound message only when the error count is less than a predetermined number.

4. The method of claim 1, wherein the receiving step comprises the step of monitoring the inbound channel during a predetermined time window assigned to the second portable subscriber unit, and wherein the method includes the step of noting a time of receipt of the inbound message by the second portable subscriber unit, and wherein the retransmitting step comprises the step of retransmitting the inbound message only when the time of receipt falls within the predetermined time window.

5. The method of claim 1, wherein the two-way radio messaging system transmits outbound messages utilizing a synchronous protocol, and wherein the receiving step comprises the step of monitoring the inbound channel during a predetermined time window assigned to the second portable subscriber unit, and wherein the second portable subscriber unit is synchronized with the synchronous protocol such that the receiving step and the retransmitting step occur at predetermined times in a cycle of the synchronous protocol.

6. The method of claim 5, comprising the step of dynamically adjusting the predetermined time window according to how many portable subscriber units are present in the two-way radio messaging system.

7. A portable subscriber unit for inbound transmission in a two-way radio messaging system including a base transmitter and a base receiver, the portable subscriber unit comprising:

an antenna for transmitting and receiving messages;

a receiver coupled to the antenna for receiving an inbound message intended for the base receiver and originally transmitted on an inbound channel by a second portable subscriber unit;

a transmitter coupled to the antenna for retransmitting the inbound message on the inbound channel; and a processing system coupled to the transmitter and coupled to the receiver for processing transmitted and received messages, the processing system including a memory, wherein the processing system is programmed to:

determine whether to control the transmitter to retransmit the inbound message by performing at least one of:

a content history method;

a life count method; and a signal quality method;

wherein the content history method programs the processing system to:

compare a content of the inbound message with contents of most recently retransmitted inbound messages in a history stored in the memory;

control the transmitter to retransmit the inbound message on the inbound channel only when the content of the inbound message does not match the content of any message in the history; and store the content of the inbound message in the history after retransmitting the inbound message, and wherein the life count method programs the processing system to change a life count received with the inbound message by a predetermined amount and control the transmitter to retransmit the inbound message and the life count, only when the life count remains within a predetermined range, and wherein the signal quality method programs the processing system to:

cooperate with the receiver to maintain a first signal quality index indicative of a received signal quality of an outbound transmission received from the base transmitter; and control the transmitter to retransmit the inbound message only when a second signal quality index included with the inbound message and maintained by the second portable subscriber unit is at least a predetermined amount less than the first signal quality index.

8. The portable subscriber unit of claim 7, wherein the processing system is further programmed to cooperate with the receiver to determine a signal strength at which the inbound message is received by the portable subscriber unit, and wherein the processing system is further programmed to control the transmitter to retransmit the inbound message only when the signal strength is below a predetermined value.

9. The portable subscriber unit of claim 7, wherein the processing system is further programmed to determine an error count of uncorrectable errors existing in the inbound message as received by the portable subscriber unit, and wherein the processing system is further programmed to control the transmitter to retransmit the inbound message only when the error count is less than a predetermined number.

10. The portable subscriber unit of claim 7, wherein the processing system is further programmed to control the receiver to monitor the inbound channel during a predetermined time window assigned to the portable subscriber unit, and wherein the processing system is further programmed to:
  note a time of receipt of the inbound message by the portable subscriber unit; and
  control the transmitter to retransmit the inbound message only when the time of receipt falls within the predetermined time window.

11. The portable subscriber unit of claim 7, wherein the two-way radio messaging system comprises outbound messages utilizing a synchronous protocol, and wherein the processing system is further programmed to control the receiver to monitor the inbound channel during a predetermined time window assigned to the portable subscriber unit, and wherein the processing system is further programmed to synchronize the receiver and the transmitter with the synchronous protocol such that receptions and retransmissions occur at predetermined times in a cycle of the synchronous protocol.

12. The portable subscriber unit of claim 11, wherein the processing system is further programmed to dynamically adjust the predetermined time window according to how many portable subscriber units are present in the two-way radio messaging system in response to commands received from the base transmitter.

\* \* \* \* \*